July 1, 1930.  F. R. KLAUS  1,769,296
DUAL WHEEL STRUCTURE
Filed March 23, 1927   2 Sheets-Sheet 1
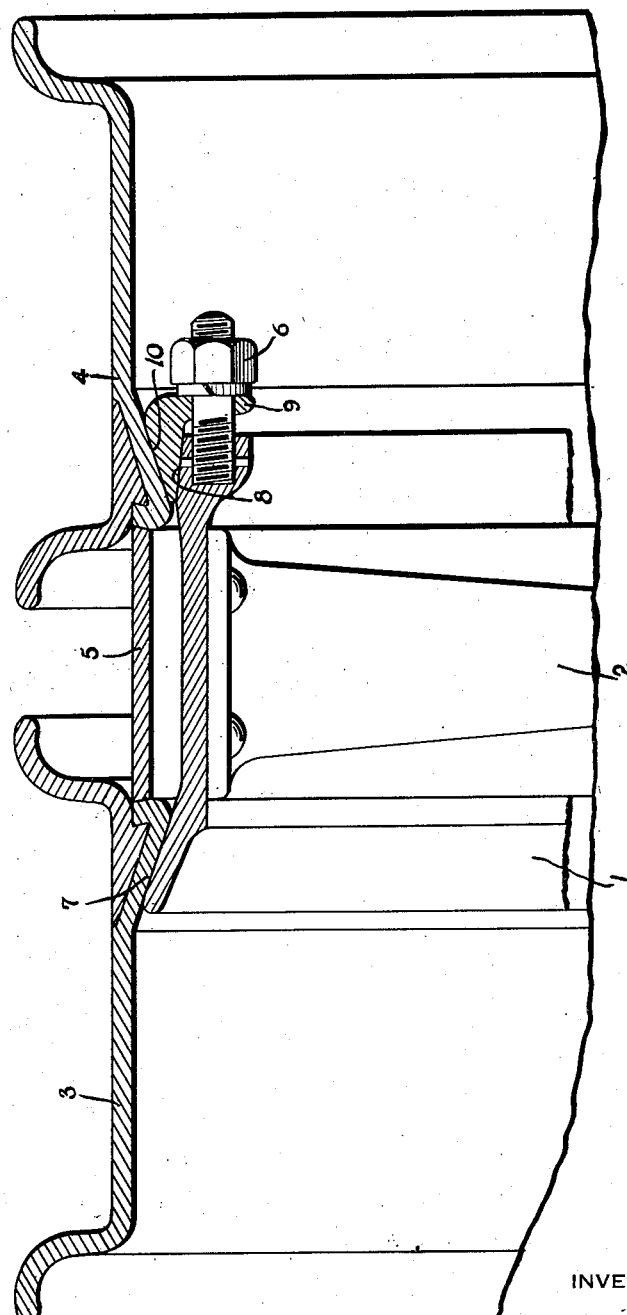
INVENTOR
Fred R. Klaus.
BY
ATTORNEY

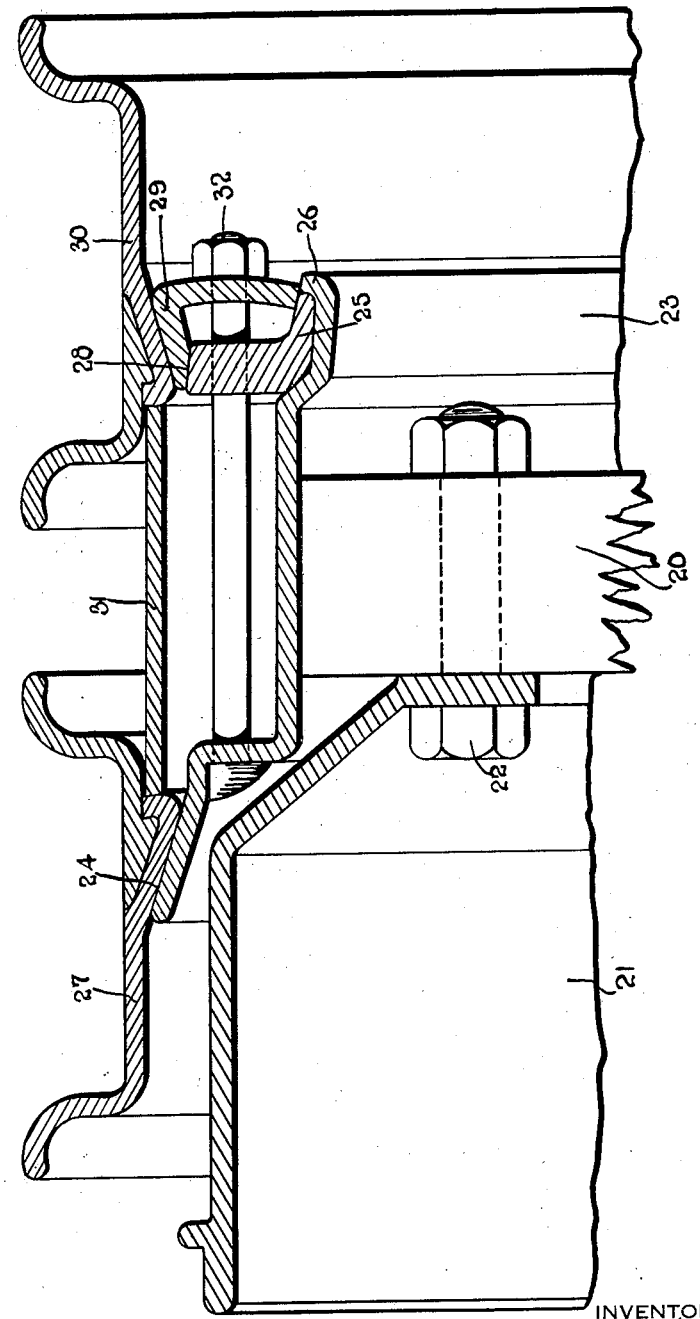

Patented July 1, 1930

1,769,296

UNITED STATES PATENT OFFICE

FRED R. KLAUS, OF WARREN, OHIO, ASSIGNOR TO THE GOODYEAR TIRE & RUBBER COMPANY, OF AKRON, OHIO, A CORPORATION OF OHIO

DUAL WHEEL STRUCTURE

Application filed March 23, 1927. Serial No. 177,646.

This invention relates to mountings for securing tire carrying rims on vehicle wheels and particularly to mountings for securing a plurality of such rims on a single vehicle wheel.

The primary object of the present invention is to provide an improved form of mounting for rigidly securing a plurality of standard commercial forms of tire carrying rims to a single vehicle wheel which shall embody a minimum number of inexpensive removable parts that are of relatively light weight, rugged in construction, and readily assembled or disassembled.

An additional object of the invention is to provide a particularly durable and inexpensive light weight felloe construction for vehicle wheel structures of the above designated character.

Other objects and advantages to be derived from practicing the invention will be apparent to those skilled in the art from a consideration of the accompanying description and drawings illustrating preferred applications of the invention, wherein:

Figure 1 is a transverse cross sectional view of a rim and wheel mounting illustrating a preferred embodiment of the invention; and Fig. 2 is a corresponding cross sectional view of a modified application of the invention.

The wheel assembly shown in Fig. 1, with parts broken away, comprises a felloe band 1, that is mounted on the outer ends of suitable spokes 2 of a vehicle wheel, and a pair of opposed tire carrying rims 3 and 4 of suitable standard commercial form that are spaced by an annular band 5 and held in place by suitable clamping mechanism 6.

The felloe 1 has an outwardly flared seating face 7 formed along one edge portion and a second seating face 8 formed along the other marginal edge portion. The seating face 7 directly receives and supports the tire carrying rim 3. The second seating face 8 engages one of the wedging faces of a suitable wedge ring 9 of conventional form that provides a seating face 10 for supporting the rim 4. The clamping mechanism 6, that laterally forces the wedge ring 9 into seating relation with the rim 4, also crowds the rim 3 laterally to secure seating relation on the seating face 7 by applying lateral pressure thereto through the endless spacing band 5. The clamping means 6 are preferably spaced uniformly around the wheel felloe.

The feature of the invention to which attention is particularly invited is the provision of the relatively light weight separately formed spacing band 5 that is preferably held in place solely by the rim elements 3 and 4. Such a band replaces the more or less elaborate clamping equipment that has heretofore been used to secure the innermost tire carrying rim 3 of the assembly in place on the wheel structure. This band also utilizes the pressure from the clamping means 6 for forcing both of the tire carrying rims into position on the wheel felloe and securely clamping them in place without resorting to cumbersome special forms of rim structure. Although the band illustrated is supported solely from the rims 3 and 4, the invention contemplates any separately formed band that is interposed between the rims and so related to the wheel structure as to force the innermost rim member securely on its seat by the application of pressure to the outermost rim member, the band being held in its final position solely by its engagement with the tire carrying rims and being unadapted to provide a seating face for radially supporting either of the rim members.

In the event that it is desired to remove either of the tire carrying rims 3 or 4 from the wheel structure, the securing nuts of the clamping means 6 are removed and the wedge ring 9, that is clamped in place thereby, is then removed in accordance with conventional practice. This releases rim 4. If it is desired to also remove rim 3 from the assembly, the endless spacing band 5 and the rim 3 are then drawn axially from the wheel structure. To remount the rims on the wheel structure, the rim 3 is first placed on its supporting seat, and the spacing band 5 is then mounted in place followed by the rim 4 in the position shown. The wedge ring 9 is then mounted on the wheel structure and the clamping nuts are drawn up tightly to crowd the rim 3 securely on its seating flange 7 of the felloe band through the force that is transmitted thereto by the band 5 and to wedge the ring 9 firmly in place between the seating face 10 of the rim 4 and the seat 8 of the felloe. The wedge ring being transversely split, rigidly clamps rim 4 in place when the bolts 6 are drawn tightly up. The wedge ring imposes radial as well as transverse pressure between the seat 10 of the rim and the seat 8 of the felloe.

The modified form of invention shown in Fig. 2 comprises a wheel structure embodying a conventional form of spoke 20, a brake band 21, that is secured to the spokes of the wheel by suitable transverse bolts 22 to preclude conducting heat from the brake band to the felloe, and a felloe 23 that is carried on the extremities of the spokes 20. The felloe has an outwardly flared rim seating face 24 formed along one edge portion and a suitable gutter formed along the other edge portion for receiving an endless or transversely split ring 25 that is secured in place by the outwardly extending edge flange 26 of the felloe.

The outwardly flared seating face 24 is adapted to receive a suitable tire carrying rim 27 of suitable character and the radially outer face 28 of the ring 25 provides a mounting for the inner wedging surface of a suitable transversely split wedge ring 29 that enters between the radially inner seating face of the tire carrying rim member 30 and the seating face 28 of the ring 25. A spacing band 31, that is held in place in clamped position solely by the rim members 27 and 30 serves as a spacing member for the rims and transmits the clamping pressure from suitable transversely arranged clamping bolts 32 to both of the tire carrying rims.

In dismounting the tire carrying rims from this vehicle wheel structure, the wedge ring 29 is released by removing the clamping nuts from the transverse clamping bolts 32. This releases the tire carrying rim 30 from the wheel assembly and permits the removal of the annular band 31 axially of the wheel along with the tire carrying rim 27. In reassembling the wheel structure, the rim 27 is first mounted in place, then the spacing ring and rim 30 are assembled in place. The wedge ring 29 is then forced into place by pulling the bolts 32 tightly up to rigidly secure the outer and inner rim members in place as heretofore described.

The endless rim supporting ring 25 is separately formed and mounted in place as heretofore described by flanging the outer edge portion of the felloe, or the ring, if transversely split, is sprung into place within the formed annular groove of the felloe.

It will be seen from a consideration of the accompanying drawings and the description relating thereto that a vehicle wheel structure of the character proposed is readily assembled and disassembled for the removal, replacement, or repair of the vehicle tire by handling a minimum number of removable parts. The facility with which tire changes can be made with a wheel assembly of this character will also be apparent to those skilled in the art. Another important feature of the invention is the use in the structure of conventional forms of rim members without resorting to the use of specially constructed dual rim members that are suitable only for dual mounting.

The inexpensive character of a spacing band or other equivalent independently formed spacing means for imposing lateral clamping pressure on the innermost rim, from pressures applied to the outermost rim, will also be apparent to those skilled in the art.

The improved form of felloe structure shown in Fig. 2 provides a construction that is readily made up from rolled sheet metal of substantially uniform thickness. This insures a relatively light weight and extremely strong and durable felloe construction that can be inexpensively manufactured. The question of unsprung weight in wheel structures of this general character is very important in the art. The spacing ring 25 is an inexpensive element of the felloe and the base, being formed of sheet material, is also inexpensive and relatively strong.

Although only two forms of wheel structures are chosen to illustrate the general principles of the invention, it will be apparent to those skilled in the art that many other modifications may be resorted to without departing from the spirit and scope of the invention as herein illustrated and described.

I desired, therefore, that only such limitations shall be imposed on the invention as are set forth in the appended claim.

What I claim is:

The combination of a transplit clamping ring having a laterally extending annular clamping portion and an inwardly extending flange portion having an internal seating face formed thereon, an endless annular felloe base member having a flared rim seating face formed along one edge portion and an annular upstanding edge flange forming one side of a depressed groove formed along the other edge portion, and a separately formed endless annular ring having a seating face on its outer periphery for engagement by the clamping portion of the ring and a laterally extending foot portion provided with a seating face for engaging the internal seating face of the clamping ring, said endless annular ring being rigidly secured within the groove of the base member by the upstanding outer edge flange.

In witness whereof, I have hereunto signed my name.

FRED R. KLAUS.